US010554331B2

(12) United States Patent
Navratil et al.

(10) Patent No.: US 10,554,331 B2
(45) Date of Patent: Feb. 4, 2020

(54) QUALITY OF SERVICE DRIVEN RECEIVER SELECTIVE HYBRID AUTOMATIC REPEAT REQUEST FOR POINT-TO-MULTIPOINT COMMUNICATION

(71) Applicant: Nokia Technologies Oy, Espoo (FI)

(72) Inventors: David Navratil, Helsinki (FI); Mikko Säily, Laukkoski (FI); Ahmad Awada, Munich (DE)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 15/569,339

(22) PCT Filed: Mar. 30, 2016

(86) PCT No.: PCT/FI2016/050195
§ 371 (c)(1),
(2) Date: Oct. 25, 2017

(87) PCT Pub. No.: WO2016/185081
PCT Pub. Date: Nov. 24, 2016

(65) Prior Publication Data
US 2018/0316460 A1    Nov. 1, 2018

Related U.S. Application Data

(60) Provisional application No. 62/162,445, filed on May 15, 2015.

(51) Int. Cl.
*H04L 1/00* (2006.01)
*H04L 1/16* (2006.01)
*H04L 1/18* (2006.01)

(52) U.S. Cl.
CPC .......... *H04L 1/0018* (2013.01); *H04L 1/0021* (2013.01); *H04L 1/1657* (2013.01);
(Continued)

(58) Field of Classification Search
CPC ... H04L 1/0018; H04L 1/1854; H04L 1/1812; H04L 1/1657; H04L 1/0021; H04L 1/1825; H04L 1/1896; H04L 2001/0093
See application file for complete search history.

(56) References Cited

U.S. PATENT DOCUMENTS

| 8,245,088 B1 | 8/2012 | Sriniwas et al. |
| 2003/0035396 A1 | 2/2003 | Haartsen et al. |
(Continued)

FOREIGN PATENT DOCUMENTS

| CN | 101388756 B | 1/2013 |
| CN | 104137637 A | 11/2014 |
(Continued)

OTHER PUBLICATIONS

"New Study Item Proposal for Support of Single-Cell Point-to Multipoint Transmission in LTE", 3GPP TSG-RAN meeting #66, RP-142205, Agenda: 14.1.2, Huawei, Dec. 8-11, 2014, 6 pages.
(Continued)

*Primary Examiner* — Christine Ng
(74) *Attorney, Agent, or Firm* — Squire Patton Boggs (US) LLP

(57) ABSTRACT

Various communication systems, such as radio access networks, may benefit from various error correction techniques. For example, certain communication systems may benefit from quality of service driven receiver selective hybrid automatic repeat request for point-to-multipoint communication. A method can include identifying, at a receiver, at least one quality of service threshold. The method can also include identifying, at the receiver, at least one quality of service. The method can further include determining, at the receiver, whether or what kind of feedback is to be used for an erroneously received transport block based on the identified at least one quality of service threshold and the identified at least one quality of service. The method can
(Continued)

additionally include communicating, by the receiver, with a transmitter of the erroneously received transport block based on the determination.

15 Claims, 3 Drawing Sheets

(52) U.S. Cl.
    CPC .......... *H04L 1/1812* (2013.01); *H04L 1/1825* (2013.01); *H04L 1/1854* (2013.01); *H04L 1/1896* (2013.01); *H04L 2001/0093* (2013.01)

(56) References Cited

U.S. PATENT DOCUMENTS

| | | | | |
|---|---|---|---|---|
| 2004/0252700 | A1* | 12/2004 | Anandakumar | .. H04L 29/06027 370/395.21 |
| 2007/0110055 | A1 | 5/2007 | Fischer et al. | |
| 2010/0037105 | A1* | 2/2010 | Bourlas | ................ H04L 1/1848 714/57 |
| 2010/0281322 | A1 | 11/2010 | Park et al. | |
| 2011/0170450 | A1* | 7/2011 | Juntti | .................... H04L 1/1867 370/252 |
| 2011/0317650 | A1 | 12/2011 | Venkatachalam et al. | |
| 2012/0099461 | A1* | 4/2012 | Yi | ........................ H04B 7/2606 370/252 |
| 2013/0315124 | A1 | 11/2013 | Rapaport et al. | |
| 2015/0139144 | A1* | 5/2015 | Chai | ..................... H04W 28/08 370/329 |

FOREIGN PATENT DOCUMENTS

| | | |
|---|---|---|
| EP | 0771092 B1 | 7/2002 |
| WO | 2014/012248 A1 | 1/2014 |
| WO | 2014/110790 A1 | 7/2014 |
| WO | 2016/050262 A1 | 4/2016 |

OTHER PUBLICATIONS

Sesia et al., "The UMTS Long Term Evolution From Theory to Practice", Wiley, second Edition, 2011, 752 pages.

"3rd Generation Partnership Project; Technical Specification Group Services and System Aspects; Policy and charging control architecture (Release 13)", 3GPP TS 23.203, V13.3.0, Mar. 2015, pp. 1-231.

International Search Report and Written Opinion received for corresponding Patent Cooperation Treaty Application No. PCT/FI2016/050195, dated Jun. 16, 2016, 14 pages.

Extended European Search Report received for corresponding European Patent Application No. 16795944.4, dated Nov. 23, 2018, 7 pages.

Chinese Office Action corresponding to CN Appln. No. 201680027877.7, dated Nov. 7, 2019.

\* cited by examiner

QUALITY OF SERVICE DRIVEN RECEIVER SELECTIVE HYBRID AUTOMATIC REPEAT REQUEST FOR POINT-TO-MULTIPOINT COMMUNICATION

RELATED APPLICATION

This application was originally filed as Patent Cooperation Treaty Application No. PCT/FI2016/050195 filed Mar. 30, 2016 which claims priority benefit to U.S. Provisional Patent Application No. 62/162,445, filed May 15, 2015.

BACKGROUND

Field

Various communication systems, such as radio access networks, may benefit from various error correction techniques. For example, certain communication systems may benefit from quality of service driven receiver selective hybrid automatic repeat request for point-to-multipoint (PTM) communication.

Description of the Related Art

Hybrid automatic repeat request (HARQ) provides error correction by retransmissions. A receiver provides HARQ feedback, acknowledgments/negative acknowledgements (ACK/NACKs), to a transmitter, which retransmits the data. The transmitter HARQ can be a function of a medium access control (MAC) protocol.

The third generation partnership project (3GPP) study item, "Single-cell Point-to-Multipoint (SC-PTM)" is described in RP-142205. The study item aims to determine whether HARQ feedback and CSI report are still necessary for single-cell PTM transmission.

System efficiency can depend on the amount of data transmitted via the system in a period of time. HARQ can increase system efficiency when an appropriate coding scheme is selected. The selection of appropriate coding scheme may be a function of a network node such as an evolved node B (eNB) in long term evolution (LTE) systems. The robustness of coding scheme and the retransmission rate can define the capacity of the communication channel. The link adaptation process aims at maximizing the capacity of communication channel. For example, the typical HARQ retransmission rates may be in range of 0 to 30%.

If HARQ is applied to broadcast communication, the transmitter receives HARQ feedback from multiple receivers. If the transmitter selects the same channel coding schemes as in the case of unicast transmission and the receivers are in similar radio condition, and thus the probability of erroneous reception is assumed to be the same, then the probability of the transmitter receiving NACK increases in proportion to the number of receivers. For example, if the receiver correctly receives the transmission with probability of 70% (Pc=0.7), then the probability of correct reception by two receivers is only 49% assuming the receiving processes are independent processes. In case of 3 receivers, the probability of correct reception by all receivers is 34.3%. Therefore, the number of retransmissions increases, which may impact system efficiency. Using more robust channel coding can reduce the probability of NACKs but also decreases the spectral efficiency.

SUMMARY

According to a first embodiment, a method can include identifying, at a receiver, at least one quality of service threshold. The method can also include identifying, at the receiver, at least one quality of service. The method can further include determining, at the receiver, whether or what kind of feedback is to be used for an erroneously received transport block based on the identified at least one quality of service threshold and the identified at least one quality of service. The method can additionally include communicating, by the receiver, with a transmitter of the erroneously received transport block based on the determination.

In a variant, the determination can be to use negative acknowledgment only if correct reception of the erroneously received transport block via retransmission is deemed to be necessary in order to meet the quality of service, for example the quality of service should be superior to the quality of service threshold.

In a variant, the method can further include sending an acknowledgment when a hybrid automatic repeat request process at the transmitter requires explicit acknowledgment to proceed with transmission of next data. Alternatively, the method can further include withholding feedback if the hybrid automatic repeat request process at the transmitter operates with implicit acknowledgments.

In a variant, the method can further include adjusting, by the receiver, a medium access control configuration based on the identified at least one quality of service. This may be an adjustment of a QoS threshold.

In a variant, the identification of the at least one quality of service can include at least one of receiving the identification in radio resource control signaling or by a user service description.

In a variant, the at least one quality of service threshold can include at least one of a block loss rate over a period of time; a block loss rate over a number of consecutive blocks; a number of consecutive blocks lost; or a delay budget.

According to a second embodiment, a method can include determining, at a transmitter, at least one quality of service threshold. The method can also include provisioning, by the transmitter to a receiver, the at least one quality of service threshold. The receiver can be configured to control feedback regarding at least one erroneously received transport block based on the at least one quality of service threshold.

In a variant, the provisioning the at least one quality of service threshold can include provisioning the at least one quality of service threshold in radio resource control signaling or by a user service description.

In a variant, the at least one quality of service threshold can include at least one of a block loss rate over a period of time; a block loss rate over a number of consecutive blocks; a number of consecutive blocks lost; or a delay budget.

In a variant, providing the at least one quality of service threshold can include at least one of explicitly signaling the at least one quality of service threshold or signaling at least one parameter from which the receiver can derive the at least one quality of service threshold.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Certain embodiments may provide more advanced control of HARQ feedback as compared to previous HARQ feedback approaches.

Certain embodiments use quality of service thresholds and the observed quality of service at the receiver when making decision whether ACK, NACK or no feedback shall be sent for an erroneously received transport block, such as a packet. Each quality of service threshold can be a certain value of a quality of service parameter. The quality of service may be represented by such parameters as, for example, packet loss rate or delay budget.

In certain embodiments, for example, the receiver may send NACK only if the correct reception of erroneously received block via retransmission is deemed to be necessary in order to meet the quality of service. Otherwise, if the receiver failed to decode the block and the re-transmission is deemed not necessary to meet the quality of service, the receiver sends ACK if the HARQ process at the transmitter requires explicit acknowledgment to proceed with transmission of next data, or does not send any feedback if the HARQ process at the transmitter operates with implicit ACKs, meaning that the transmitter considers a transport block acknowledged if no NACK is received.

Assuming HARQ is part of MAC functions, the upper layers may configure MAC with the quality of service thresholds. In LTE, QoS characteristics can be defined for each service data flow (SDF), which is associated with one QoS Class Identifier (QCI). The standardized QCI values can describe the packet forwarding treatment that an SDF aggregate receives edge-to-edge between the UE and the PCEF in terms of resource type, priority, packet delays budget, and packet error loss rate. The packet error loss rate can be used in the configuration of MAC layer at the receiver. QoS threshold(s) may be derived from a QoS parameter. The HARQ receiver process in MAC can then be configured with the QoS threshold(s).

The configuration may also take into consideration a possible segmentation due to the difference between packet size and MAC transport block size. For example, the MAC can be configured such that M consecutive blocks is received at least every N blocks or similarly. This M in N approach is one example of a QoS threshold.

Figure 1:
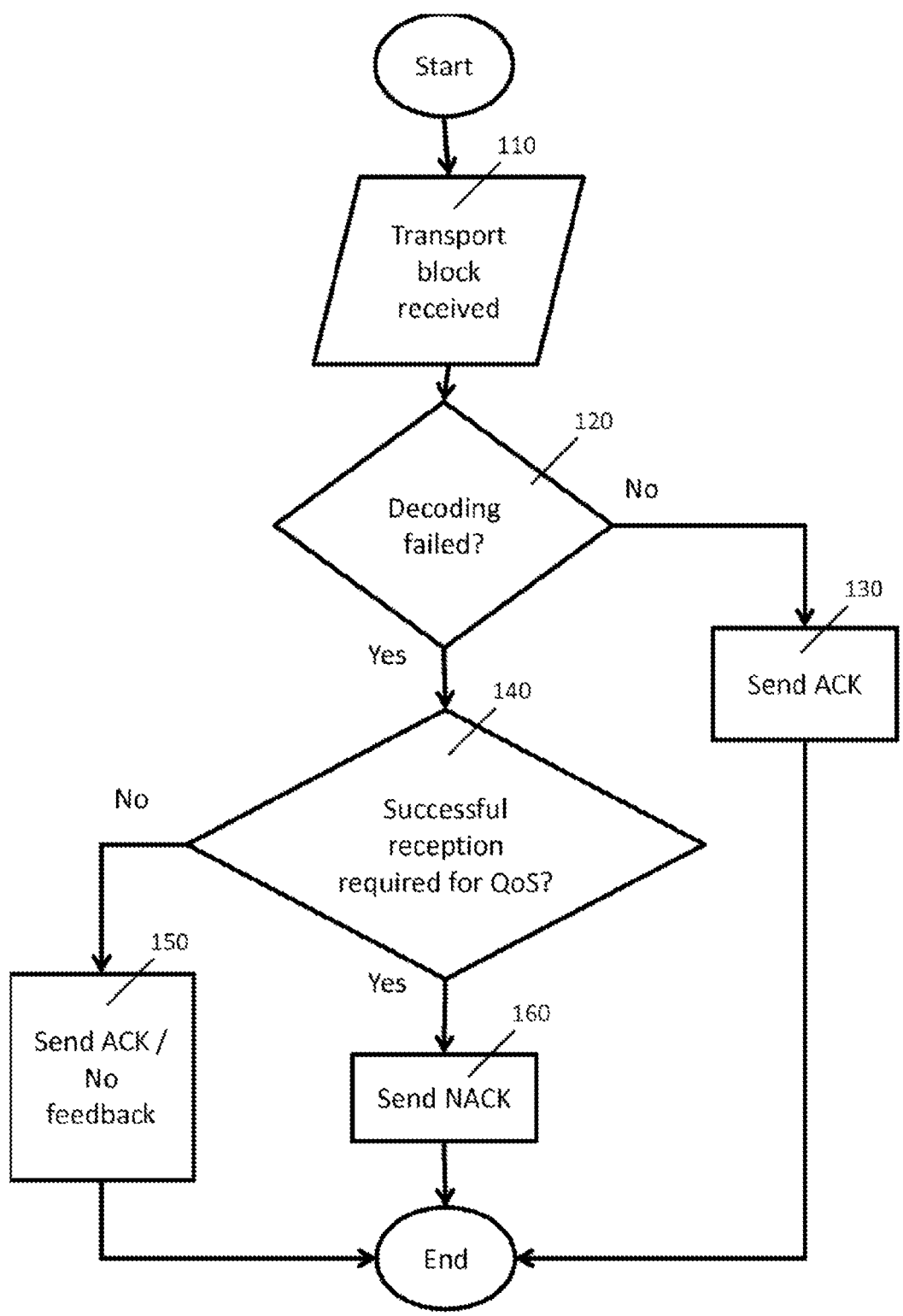
FIG. 1 illustrates receiver operation according to certain embodiments.

A MAC receiver can operate according to methods of certain embodiments. FIG. 1 illustrates receiver operation according to certain embodiments. As shown in FIG. 1, at 110 a transport block can be received from a transmitter.

At 120, the receiver can determine whether decoding failed. If it did not fail, then at 130 the receiver can send an acknowledgment, either explicitly or implicitly, depending on how acknowledgment is to be provided to the transmitter that transmitted the transport block.

At 140, the receiver can determine whether successful reception is required for quality of service. If not, then at 150 the receiver can send an acknowledgment, either explicitly or implicitly, depending on how acknowledgment is to be provided to the transmitter that transmitted the transport block. For example, for implicit acknowledgment the receiver may simply send no feedback.

If, at 140, the receiver determines that successful reception is required for quality of service, then at 160 the receiver can send a negative acknowledgement.

Not shown in FIG. 1, the upper layers can continuously monitor QoS and adjust the MAC configuration accordingly.

Conventionally in LTE, a user equipment (UE) may not be aware of QoS associated with a multimedia broadcast multicast services (MBMS) bearer. The QoS of MBMS can be terminated at a multicell coordination entity (MCE), which can use a received QoS class identifier (QCI), for example QoS characteristics, together with allocation and retention priority, maximum bit rate, and guaranteed bit rate in the admission process. The availability of the QoS parameters at a receiver, such as a UE, may be provided in certain embodiments.

The UE can be provisioned with the QoS of MBMS bearer either by RRC signaling or user service description (USD) extension.

The RRC signaling can be performed by an access node, such as an eNB, based on QoS information received from a network element such as an MCE, for example as part of an MBMS scheduling information procedure or MBMS session start procedure. The signaling of QoS parameters from MCE to eNB can also be used for SC-PTM operation.

The QoS parameters may be also included in USD. In this case, the QoS parameters used in 3GPP domain can be provided as part of temporary mobile group identity (TMGI) allocation.

Thus, certain embodiments can provide a method for controlling feedback from a receiver node to a transmitter node. In this method, a receiver node can be configured with a set of thresholds. The method can include determining, based on the configured thresholds, whether an acknowledgement, negative acknowledgement or no feedback is sent to the transmitter when the receiver failed to decode a received transport block.

The set of thresholds can be configured in accordance with quality of service. The set can include at least one of the following: a block loss rate over a period of time; a block loss rate over a number of consecutive blocks (for example, N in M); a number of consecutive blocks lost; or a delay budget.

For example, in certain embodiments the receiver node can send negative acknowledgment if the receiver does not receive the current block successfully, if the decoding failure results in a block reception quality that is inferior to the one configured with the set of thresholds.

In certain embodiments, when the transmitter operates based on an explicit acknowledgment, the receiver node can send acknowledgment even if not receiving the current block successfully, if the decoding failure will still result in a block reception quality that is superior to the one configured with the set of thresholds.

Similarly, when the transmitter operates based on an implicit acknowledgment, referring for example to a lack of negative acknowledgment, the receiver node may simply not send any feedback even if not receiving the current block successfully, when the decoding failure will still result in a block reception quality that is superior to the one configured with the set of thresholds.

Certain embodiments may have various benefits and/or advantages. For example, the capacity of the communication channel can be improved when the QoS parameters indicate the user satisfaction.

Additionally, the radio performance and user perceived QoS can be aligned by the type of delivered service. For example, different performance situations, to retransmit or not, can have different impacts on satisfaction.

The method and systems of certain embodiments may be suitable for different radio link control (RLC) modes. For example, certain embodiments may be suitable for streaming multimedia traffic, such as voice over internet protocol (VoIP).

Likewise, certain embodiments may be suitable for point-to-multipoint communications where users are in different conditions. For example, the transmission mode and retransmissions do not need to be always dictated by the HARQ process of the user in worst condition if the QoS is otherwise acceptable. Additionally, certain embodiments may work with standardized solutions of RLC transmission modes, HARQ and QoS.

Figure 2:
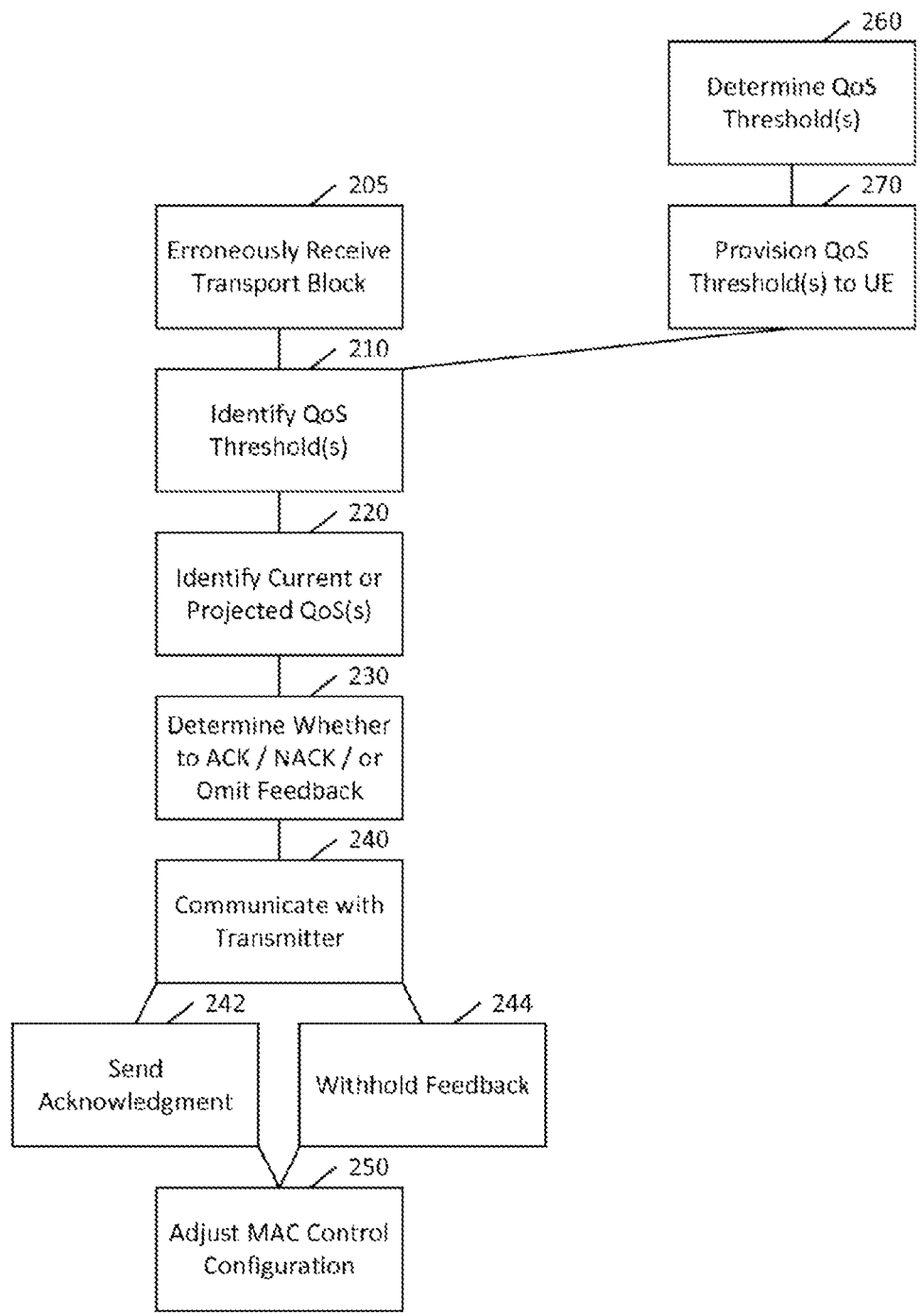
FIG. 2 illustrates a method according to certain embodiments.

FIG. 2 illustrates a method according to certain embodiments. As shown in FIG. 2, a method can include, at 210, identifying, at a receiver, at least one quality of service threshold.

The method can also include, at 220, identifying, at the receiver, at least one quality of service. This may be a current quality of service or a projected quality of service. The receiver may consider multiple quality of service values if, for example, the receiver is responsible for maintaining multiple qualities of service, for example for differentiated multiple streams.

The method can further include, at 230, determining, at the receiver, whether or what kind of feedback is to be used for an erroneously received transport block based on the identified at least one quality of service threshold and the identified at least one quality of service. For example, the receiver can project the degree to which this erroneously received transport block will have a negative effect on quality of service, or the receiver can simply measure the degree to which this erroneously received transport block is having on quality of service. The erroneously received transport block may be received at 205. A packet can be an example of a transport block, although other transport blocks are permitted.

The method can additionally include, at 240, communicating, by the receiver, with a transmitter of the erroneously received transport block based on the determination. Thus, in certain embodiments the communicating based on the determination may involve not sending any feedback until a subsequent erroneously received transport block would affect quality of service more than a certain threshold amount.

In certain embodiments, the determination can be to use negative acknowledgment only if correct reception of the erroneously received transport block via retransmission is deemed to be necessary in order to meet the quality of service, for example the (projected) quality of service should be superior to the quality of service threshold.

The method can also include, at 242, sending an acknowledgment when a hybrid automatic repeat request process at the transmitter requires explicit acknowledgment to proceed with transmission of next data. Alternatively, the method can include, at 244, withholding feedback if the hybrid automatic repeat request process at the transmitter operates with implicit acknowledgments.

The method can additionally include, at 250, adjusting, by the receiver, a medium access control configuration based on the identified at least one quality of service. For example, the method can include adjusting the QoS thresholds.

The identification of the at least one quality of service can involve at least one of receiving the identification in radio resource control signaling or by a user service description, such as an MBMS USD.

The at least one quality of service threshold can include a block loss rate over a period of time; a block loss rate over a number of consecutive blocks; a number of consecutive blocks lost; a delay budget, or any combination thereof. Other quality of service thresholds are also permitted.

The method can also include, at 260, determining, at a transmitter, at least one quality of service threshold. The method can also include, at 270, provisioning, by the transmitter to a receiver, the at least one quality of service threshold. This can be the same receiver described at 210 to 250 above. The receiver can be configured to control feedback regarding at least one erroneously received transport block based on the at least one quality of service threshold.

Quality of service can be described by a set of parameters, for example, such parameters as packet loss and delay. These parameters can be used for configuration of a HARQ receiver with a set of QoS thresholds. The QoS thresholds either may be directly values of QoS parameters or a new set of QoS parameters with corresponding values may be derived. Such derivation may take place, for example, due to expected segmentation.

When it comes to provisioning the UE with information, at least two cases can be performed. In a first case, the UE can be provisioned by the network with QoS parameters and the UE can identify QoS thresholds. In a second case, the UE can be provisioned by the network with QoS thresholds.

In the first case, the network can be viewed as implicitly provisioning the UE with the thresholds, for example if the network can predict how the UE will derive the thresholds from the QoS parameters. Thus, broadly the network can be said to be provisioning the QoS thresholds either by explicitly signaling the thresholds or by signaling the parameters from which the UE can derive the thresholds.

Figure 3:
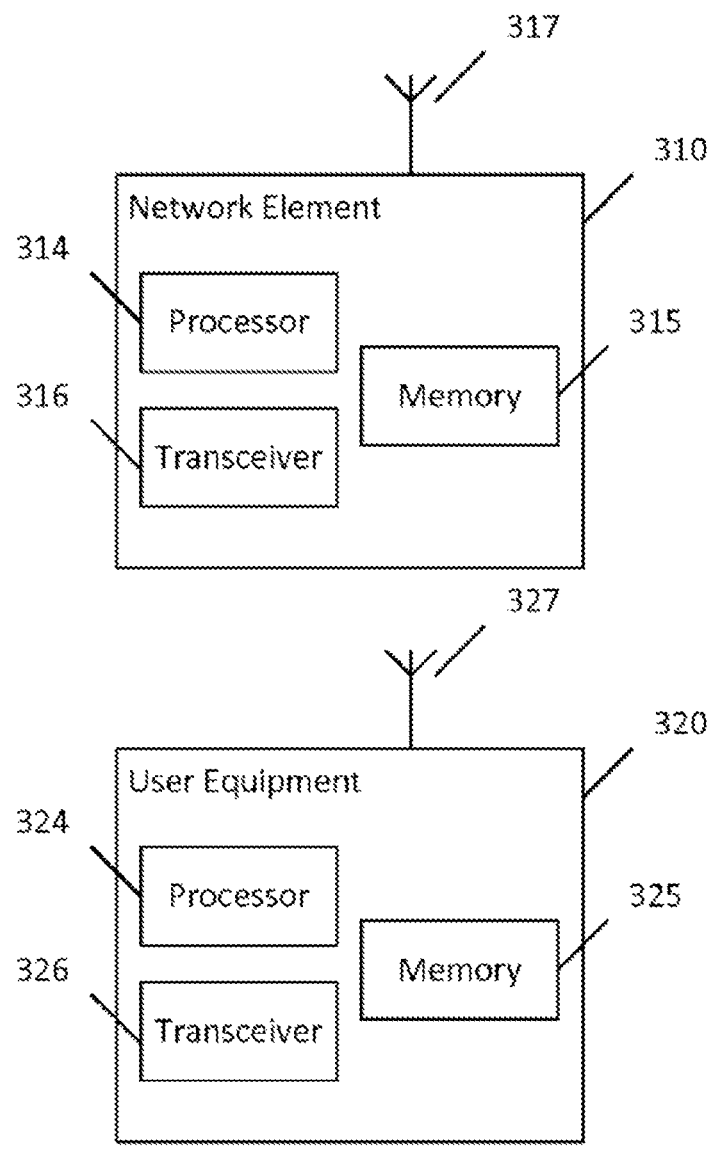
FIG. 3 illustrates a system according to certain embodiments.

FIG. 3 illustrates a system according to certain embodiments of the invention. It should be understood that each block of the flowcharts of FIGS. 1 and 2 may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), or any other network element.

Each of these devices may include at least one processor or control unit or module, respectively indicated as 314 and 324. At least one memory may be provided in each device, and indicated as 315 and 325, respectively. The memory may include computer program instructions or computer code contained therein, for example for carrying out the embodiments described above. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIGS. 1 and 2.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FP-GAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIGS. 1 and 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

In relation to the above embodiments, in certain cases the network element 310 may be the transmitter and the UE 320 may be the receiver, although this is not required.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

List of Abbreviations

ACK Acknowledgment
HARQ Hybrid Automatic Repeat Request
MAC Medium Access Control
MCE MBMS Coordination Entity
NACK Negative Acknowledgment
PCEF Policy and Charging Enforcement Function
QoS Quality of Service
QCI QoS Class Identifier
RLC Radio Link Control
RRC Radio Resource Control
SC-PTM Single-cell point-to-multipoint
TMGI Temporary Mobile Group Identity
UE User Equipment
USD MBMS User Service Description

The invention claimed is:
1. A method, comprising:
identifying, at a receiver, at least one quality of service threshold;
identifying, at the receiver, at least one quality of service;

determining, at the receiver, whether or what kind of feedback is to be used for an erroneously received transport block based on the identified at least one quality of service threshold and the identified at least one quality of service, wherein the determination comprises using negative acknowledgment only if correct reception of the erroneously received transport block via retransmission is deemed to be necessary in order to meet the quality of service; and communicating, by the receiver, with a transmitter of the erroneously received transport block based on the determination.

2. The method of claim 1, further comprising:

sending an acknowledgment when a hybrid automatic repeat request process at the transmitter requires explicit acknowledgment to proceed with transmission of next data.

3. The method of claim 1, further comprising:

withholding feedback in case the hybrid automatic repeat request process at the transmitter operates with implicit acknowledgments.

4. The method of claim 1, further comprising:

adjusting, by the receiver, a medium access control configuration based on the identified at least one quality of service.

5. The method of claim 1, wherein the identification of the at least one quality of service comprises at least one of receiving the identification in radio resource control signaling or by a user service description.

6. The method of claim 1, wherein the at least one quality of service threshold comprises at least one of a block loss rate over a period of time, a block loss rate over a number of consecutive blocks, a number of consecutive blocks lost, or a delay budget.

7. An apparatus, comprising:

at least one processor; and at least one memory including computer program code, wherein the at least one memory and the computer program code are configured to, with the at least one processor, cause the apparatus at least to identify at least one quality of service threshold;

identify at least one quality of service;

determine whether or what kind of feedback is to be used for an erroneously received transport block based on the identified at least one quality of service threshold and the identified at least one quality of service, wherein the determination comprises using negative acknowledgment only if correct reception of the erroneously received transport block via retransmission is deemed to be necessary in order to meet the quality of service; and communicate with a transmitter of the erroneously received transport block based on the determination.

8. The apparatus of claim 7, wherein the at least one memory and the computer program code are further configured, with the at least one processor, to cause the apparatus at least to:

send an acknowledgment when a hybrid automatic repeat request process at the transmitter requires explicit acknowledgment to proceed with transmission of next data.

9. The apparatus of claim 7, wherein the at least one memory and the computer program code are further configured, with the at least one processor, to cause the apparatus at least to:

withhold feedback in case the hybrid automatic repeat request process at the transmitter operates with implicit acknowledgments.

10. The apparatus of claim 7, wherein the at least one memory and the computer program code are further configured, with the at least one processor, to cause the apparatus at least to:

adjust a medium access control configuration based on the identified at least one quality of service.

11. The apparatus of claim 7, wherein the identification of the at least one quality of service comprises at least one of receiving the identification in radio resource control signaling or by a user service description.

12. The apparatus of claim 7, wherein the at least one quality of service threshold comprises at least one of a block loss rate over a period of time, a block loss rate over a number of consecutive blocks, a number of consecutive blocks lost, or a delay budget.

13. An apparatus, comprising:

at least one processor; and at least one memory including computer program code, wherein the at least one memory and the computer program code are configured to, with the at least one processor, cause the apparatus at least to determine at least one quality of service threshold; and provision, to a receiver, the at least one quality of service threshold, wherein the receiver is configured to control feedback regarding at least one erroneously received transport block based on the at least one quality of service threshold, wherein the feedback comprises a negative acknowledgement only if correct reception of the at least one erroneously received transport block via retransmission is deemed to be necessary in order to meet a quality of service.

14. The apparatus of claim 13, wherein provisioning the at least one quality of service threshold comprises provisioning the at least one quality of service threshold in radio resource control signaling or by a user service description.

15. The apparatus of claim 13, wherein the at least one quality of service threshold comprises at least one of a block loss rate over a period of time, a block loss rate over a number of consecutive blocks, a number of consecutive blocks lost, or a delay budget.

* * * * *